United States Patent
Winkel et al.

(10) Patent No.: US 11,771,075 B2
(45) Date of Patent: Oct. 3, 2023

(54) AGRICULTURAL VEHICLE HAVING A BRAKE PEDAL INTERFACE FOR CONTROLLING AN APPLICATION BOOM

(71) Applicant: CNH Industrial America LLC, New Holland, PA (US)

(72) Inventors: Steven Winkel, Kiel, WI (US); Nathan Brooks, Manitowoc, WI (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 610 days.

(21) Appl. No.: 16/690,962

(22) Filed: Nov. 21, 2019

(65) Prior Publication Data
US 2021/0153495 A1    May 27, 2021

(51) Int. Cl.
| | | |
|---|---|---|
| *A01M 7/00* | (2006.01) | |
| *A01C 23/04* | (2006.01) | |
| *B05B 15/68* | (2018.01) | |
| *B05B 1/20* | (2006.01) | |
| *G05G 1/30* | (2008.04) | |

(52) U.S. Cl.
CPC ......... *A01M 7/0075* (2013.01); *A01C 23/047* (2013.01); *A01M 7/0089* (2013.01); *B05B 1/20* (2013.01); *B05B 15/68* (2018.02); *G05G 1/30* (2013.01); *G05D 2201/0201* (2013.01)

(58) Field of Classification Search
CPC ... A01M 7/0075; A01M 7/0089; B05B 15/68; B05B 1/20; A01C 23/047; G05G 1/30; G05D 2201/0201
See application file for complete search history.

(56) References Cited

U.S. PATENT DOCUMENTS 5,755,382 A    5/1998  Skotinkov
9,045,039 B2   6/2015  Ringer et al.
(Continued)

FOREIGN PATENT DOCUMENTS

EP    3372077    9/2018

OTHER PUBLICATIONS

"2018 Booms Operator's Manual"; operator's manual; 2018; 94 pages; Hagie Manufacturing Company; Clarion, Iowa USA; available at: https://www.hagie.com/Virtual/Manuals/Spray%20Boom%20Manuals/2018/493749%20BOOM%20OPERATORS%20MANUAL%202018.pdf; website accessed Jul. 19, 2019.
(Continued)

*Primary Examiner* — Elaine Gort
*Assistant Examiner* — Anthony M Gartrelle
(74) *Attorney, Agent, or Firm* — Rebecca Henkel; Rickard Demille

(57) ABSTRACT

According to an aspect of the invention, the brake pedal of an agricultural vehicle can be used as an interface to control auto fold/unfold sequences on a sprayer. This can allow functionality to be moved from a button, such as on the armrest, to the brake pedal using a controller, sensing and software. In one aspect, a button on the armrest can start the sequence, as long as the brake pedal is depressed. After the button is pressed, the operator can remove his hand from the button, but maintain the brake pedal depressed. If the operator lifts his foot off of the pedal, or initiates a different boom control button press, the sequence can stop. This can advantageously allow the operator to have the use of his hands during the sequence.

17 Claims, 7 Drawing Sheets

(56) References Cited

U.S. PATENT DOCUMENTS

| | | | |
|---|---|---|---|
| 9,370,175 B2 | 6/2016 | Swinney, II et al. | |
| 9,662,975 B2 | 5/2017 | Treinen | |
| 10,028,498 B2* | 7/2018 | Brooks | A01M 7/0089 |
| 2011/0153169 A1 | 6/2011 | Peterson | |
| 2015/0216118 A1* | 8/2015 | Swinney, II | A01M 7/0053 |
| | | | 239/159 |
| 2016/0244033 A1* | 8/2016 | Uchida | B60T 7/065 |
| 2019/0053481 A1 | 2/2019 | Snyder | |
| 2019/0124822 A1 | 5/2019 | Czapka et al. | |
| 2019/0134656 A1* | 5/2019 | Brooks | B05B 12/124 |

OTHER PUBLICATIONS

"Unfold Spray Boom"; available at: http://manuals.deere.com/omview/OMKK47278_19/?tM=HO; website accessed Jul. 19, 2019; 2 pages; Deere & Company.

* cited by examiner

AGRICULTURAL VEHICLE HAVING A BRAKE PEDAL INTERFACE FOR CONTROLLING AN APPLICATION BOOM

FIELD OF THE INVENTION

The invention relates generally to agricultural machines having application booms mounted thereon and, in particular, to a system for folding and unfolding an application boom while a brake pedal is depressed and ceasing to fold or unfold the boom when the brake pedal ceases to be depressed.

BACKGROUND

Various types of agricultural vehicles (e.g., sprayers, floaters, applicators, collectively referred to herein as applicators) are employed to deliver fertilizer, pesticides, herbicides, or other products to the surface of a field. Such agricultural vehicles typically include an application boom configured to facilitate product delivery over wide swaths of soil. The application boom typically can be folded inward, toward the vehicle when the boom is not in use, so as to maximize space savings, and unfolded outward, away from the vehicle, when desirable to use the boom for field operations such as spraying.

Some agricultural vehicles include a button or switch for automatically folding or unfolding the boom relative to the vehicle. A user must typically press and hold the switch to completely fold the boom (when unfolded) or to completely unfold the boom (when folded). Continuously holding the button while the boom adjusts can be uncomfortable for the operator. Moreover, holding the button limits the operator's freedom to use their hands for other tasks. A need therefore exists to provide a system for folding and unfolding a boom which eliminates one or more of the foregoing disadvantages.

SUMMARY OF THE INVENTION

According to an aspect of the invention, the brake pedal of an agricultural vehicle can be used as an interface to control auto fold/unfold sequences on a sprayer. This can allow functionality to be moved from a button, such as on the armrest, to the brake pedal using a controller, sensing and software. In one aspect, a button on the armrest can start the sequence, as long as the brake pedal is depressed. After the button is pressed, the operator can remove his hand from the button, but maintain the brake pedal depressed. If the operator lifts his foot off of the pedal, or initiates a different boom control button press, the sequence can stop. This can advantageously allow the operator to have the use of his hands during the sequence.

Specifically, then, one aspect of the invention can provide a system for controlling an application boom mounted to an agricultural vehicle. The system can include: an application boom configured to deliver agricultural product to a field, the application boom having multiple actuators configured to fold and unfold the boom relative to the agricultural vehicle; a brake pedal for braking the agricultural vehicle when the brake pedal is depressed; and a controller in communication with the actuators and the brake pedal, the controller having a processor executing a program stored in a non-transient medium operable to: receive a command to fold or unfold the boom relative to the agricultural vehicle; and following the command, control the actuators to fold or unfold the boom relative to the agricultural vehicle while the brake pedal is depressed and cease to fold or unfold the boom relative to the agricultural vehicle when the brake pedal ceases to be depressed.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
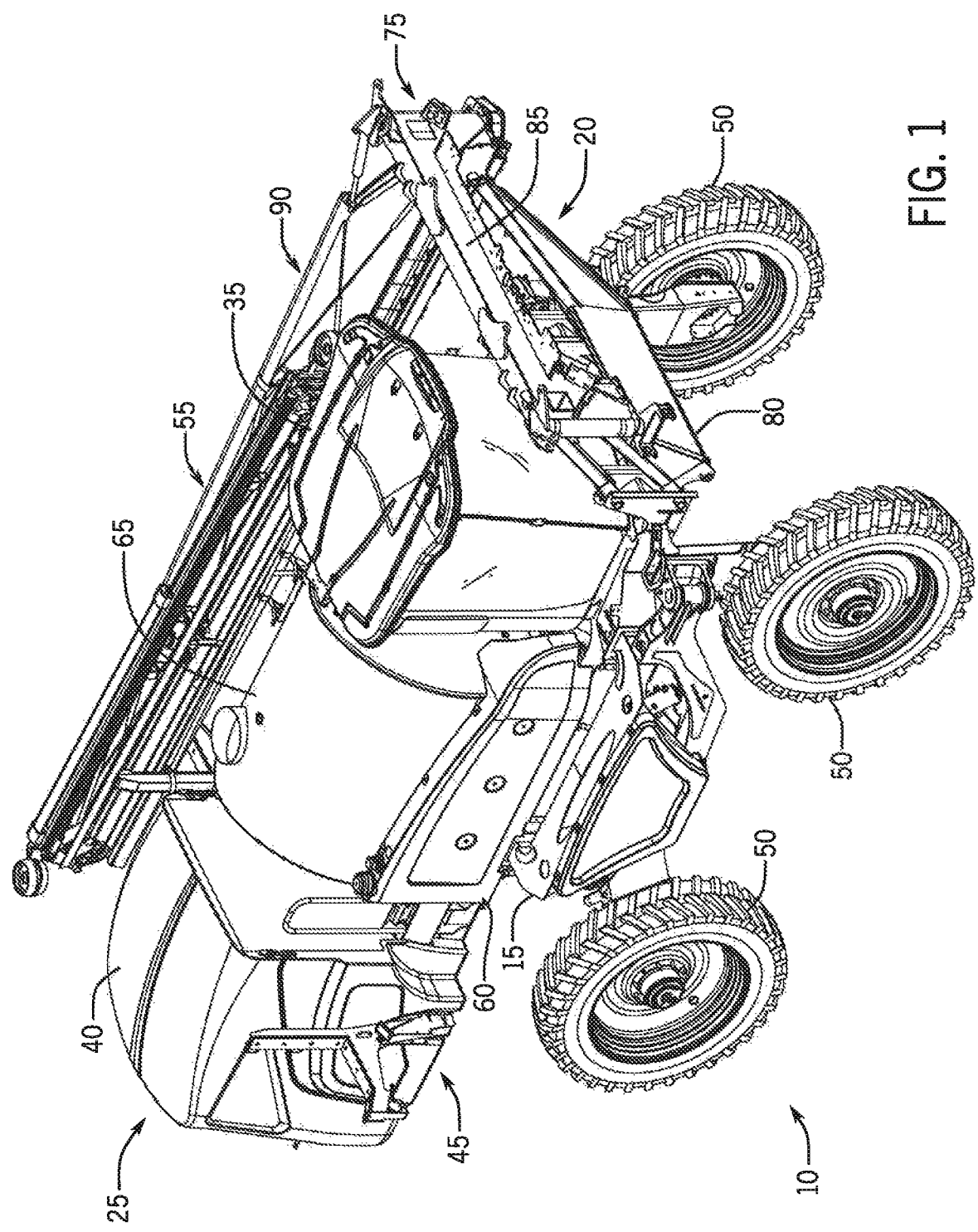
FIG. 1 is an isometric view of a front-boom sprayer from a first perspective, where the boom is folded, in a raised and retracted position.

Referring now to the drawings and specifically to FIGS. 1-4, aspects of the invention are shown for use with an agricultural vehicle, which is shown in the figures to be an agricultural sprayer vehicle (referred to herein as simply a "sprayer") 10. The sprayer 10 is shown as a front-boom sprayer, such as those available from CNH Industrial, including the Miller Nitro sprayers and New Holland Guardian Series sprayers. Other arrangements for the sprayer 10 are contemplated, including a rear-mounted configuration boom sprayer, such as those available from CNN Industrial, including the Miller Condor Series sprayers and New Holland Guardian Series rear-boom sprayers. Moreover, other agriculture machines and vehicles incorporating aspects of the invention are contemplated, including agriculture vehicles having a boom.

The sprayer 10 includes a frame or chassis 15 having front and back ends 20 and 25, respectively. The chassis 15 provides structural support for various assemblies, systems, and components of the sprayer 10. These various assemblies, systems, and components can include an operator cab 35 in a forward position toward the front end 20 of the chassis 15. An engine 40 and a hydraulic system 45 are shown in a rearward position toward the back end 25 of the chassis 15. The hydraulic system 45 receives power from the engine 40 and includes at least one hydraulic pump which can be in a hydrostat arrangement. The hydraulic pump(s) provide hydraulic pressure for operating hydraulic components within the hydraulic system 45. For sprayers with hydrostatic drives, hydraulic motors are operably connected to the hydraulic pump(s) for rotating wheels 50 of the sprayer 10. In mechanical drive applications, a mechanical transmission receives power from the engine 40 and delivers power for rotating the wheels 50 by way of power-transmitting driveline components. Example power-transmitting driveline components include drive shafts, differentials, and other gear sets in portal, drop boxes, or other housings.

A spray-application system 55 is supported by the chassis 15. The spray-application system 55 includes storage containers, such as a rinse tank 60 for storing water or a rinsing solution and a product tank 65 for storing a volume of product for delivery onto an agricultural field with the sprayer 10. The product includes any of a variety of agricultural liquid products, such as various pesticides, herbicides, fungicides, liquid fertilizers, and other liquids including liquid suspensions beneficial for application onto agricultural fields. A product delivery pump can convey product from the product tank 65 through plumbing components to nozzle bodies on an application boom 75. The plumbing components includes a piping system for transport of the product from the tank to the nozzle bodies. The nozzle bodies are spaced from each other along the width of boom 75 for spraying operations of the sprayer 10. Groups or banks of multiple adjacent nozzle bodies define multiple spray segments of the spray system. Spray segments are defined along the boom 75 and selectively deliver product for release onto an agricultural field at locations corresponding to positions of activated spray segments.

Figure 2:
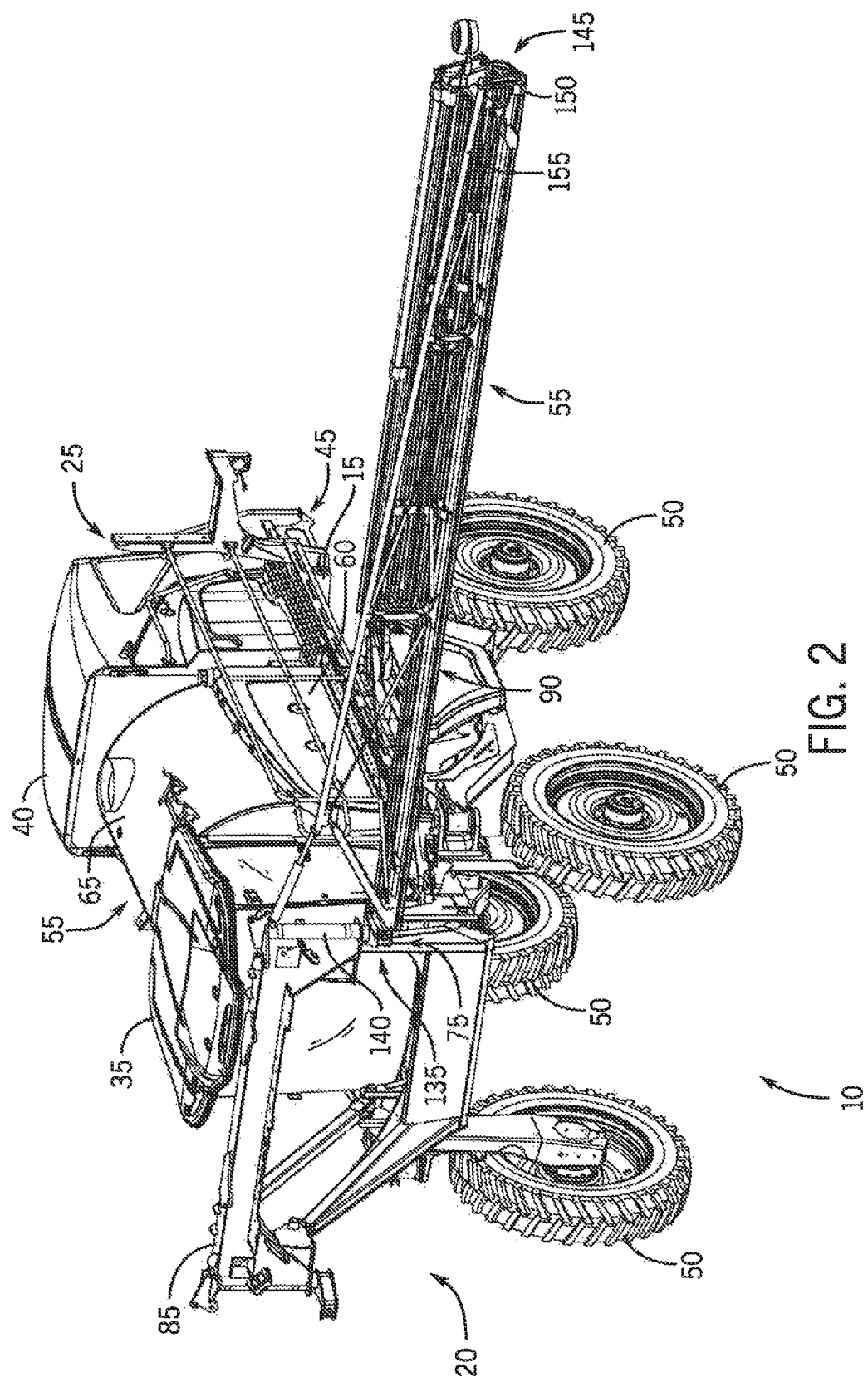
FIG. 2 is an isometric view from a second perspective of the front-boom sprayer of FIG. 1, where the boom is in a raised position, the right boom arm is removed, a first boom arm segment of the left boom arm is in an extended positioned, and second and third boom arm segments of the left boom arm are in the retracted position.

The boom 75 is connected to the chassis 15 with a lift arm arrangement or assembly 80. The lift arm assembly 80 is attached to a boom center section 85. The lift arm assembly 80 is configured to move the boom 75 up and down for adjusting the height of application of the product and/or to raise the boom 75 above objects (e.g., agricultural product). FIGS. 1 and 2 show the boom in a raised position, and FIGS. 3 and 4 show the boom in a lowered position.

Coupled to the boom center section 85, the boom 75 has multiple interconnected segments that collectively define each of a left and right boom arm, respectively. Left and right for the boom 75 are defined with respect to an operator's view of the boom 75 from the operator cab 35. Left and right boom arms extend in opposite directions from the boom center section 85. The left and right boom arms are mirror identical about a longitudinal axis of the sprayer 10, and thus, only left boom arm 90 is shown and described in further detail. For simplicity, FIGS. 1-4 show the right boom arm removed. FIG. 1 shows the left boom arm 90 in a retracted, or transport, position. FIGS. 2-4 show the left boom arm 90 in an extended position.

The left boom arm 90 has multiple segments, including first, second, and third boom arm segments 100, 105, and 110 (FIG. 4), respectively. The number of boom arm segments can vary among sprayer designs. Collectively, the boom center section 85, the left boom arm 90, and the right boom arm define the boom 75, which has left and right ends, respectively. The boom 75 has an inner facing or inward side 125 that faces toward the operator cab 35 and provides a vehicle mounting surface(s) with mounting structures configured for mounting the boom 75 to the lift arm assembly 80. Opposite the inner facing side 125 is an outer facing or outward side 130 of the boom 75 that faces away from the operator cab 35.

Figure 3:
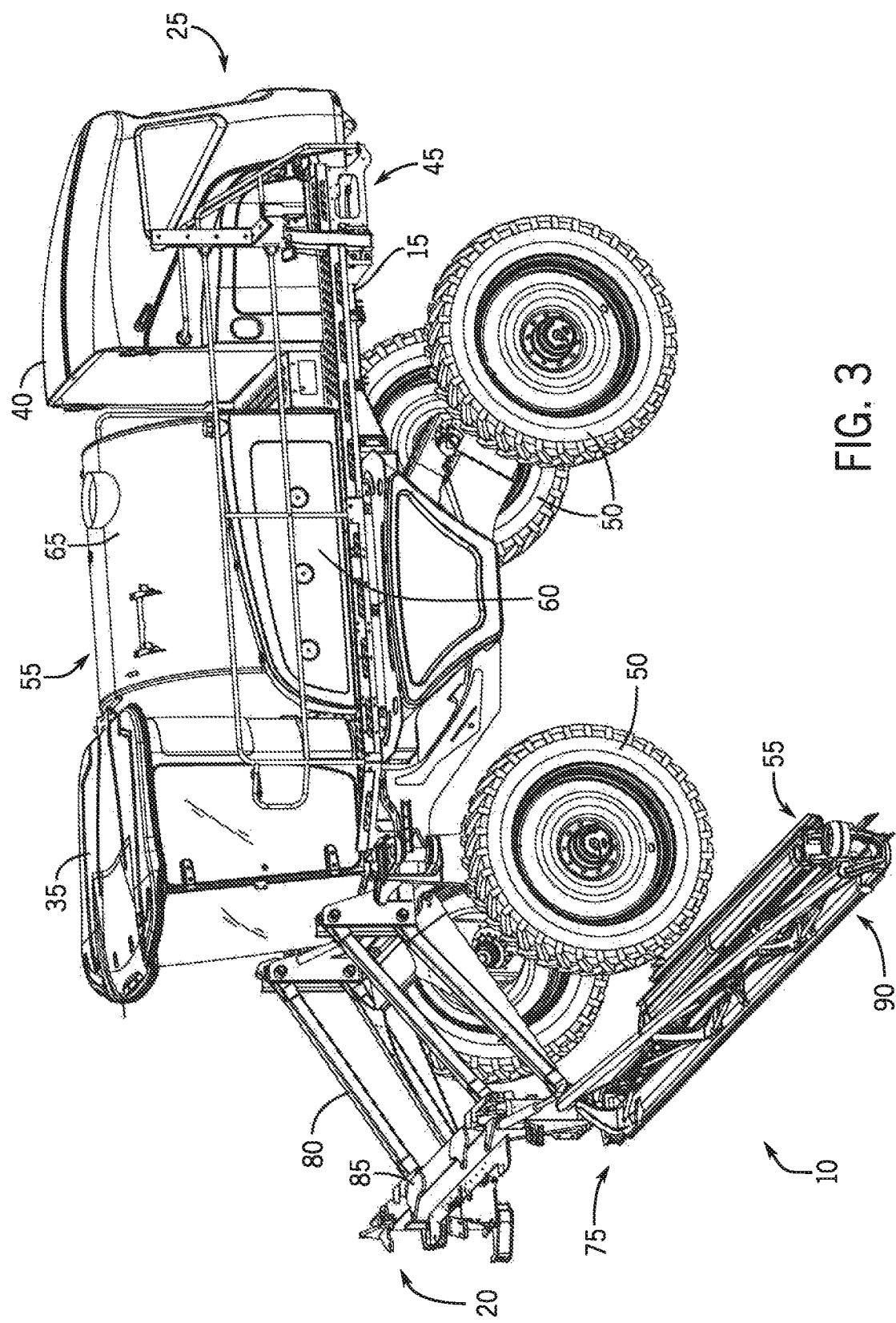
FIG. 3 is an isometric view from the second perspective of the front-boom sprayer of FIG. 1, where the boom is in a lowered position, the right boom arm is removed, the first boom arm segment of the left boom arm is in the extended positioned, and the second and third boom arm segments of the left boom arm are in the retracted position.
Figure 4:
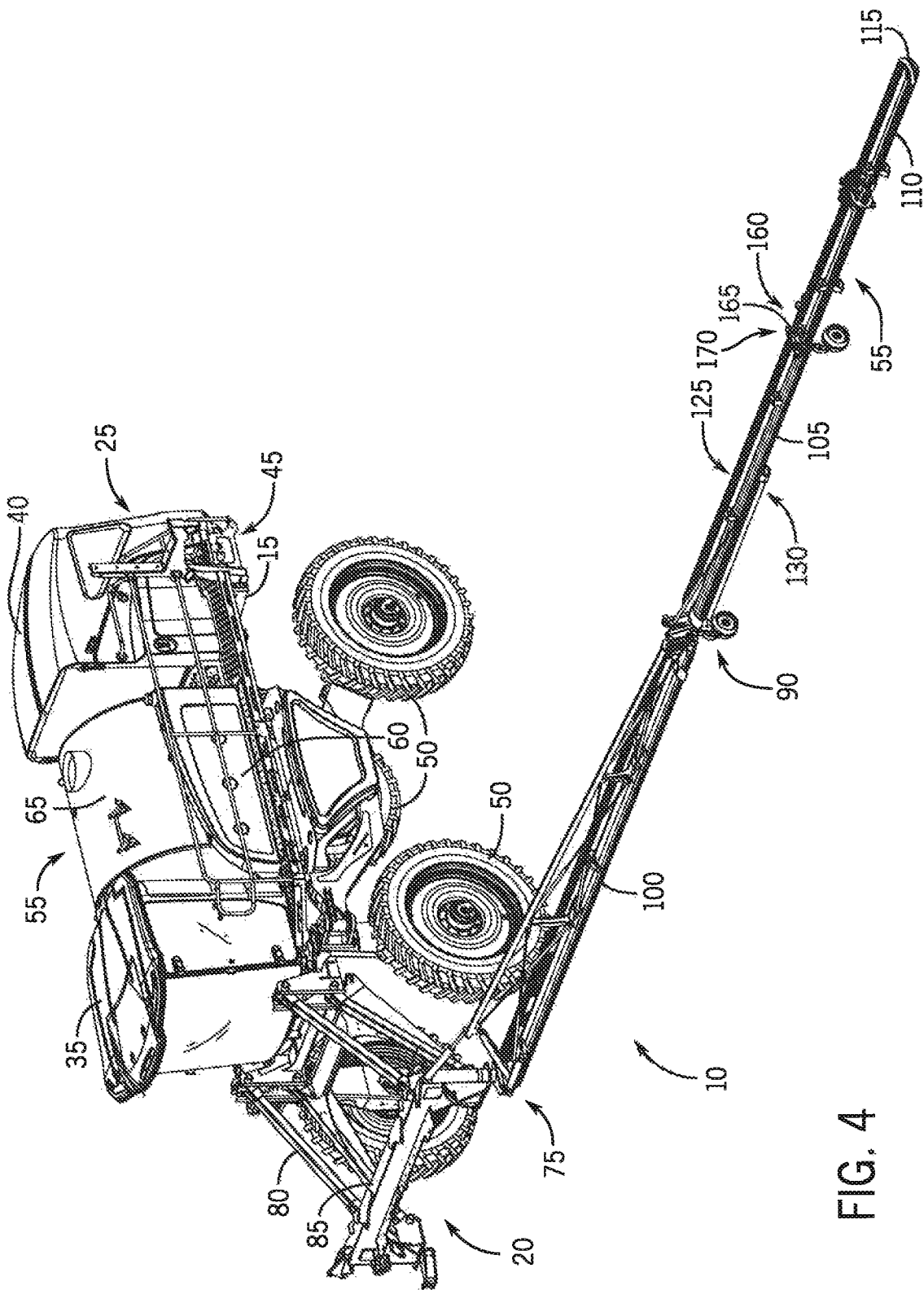
FIG. 4 is an isometric view from the second perspective of the front-boom sprayer of FIG. 1, where the boom is unfolded, in a lowered and fully extended position.

FIGS. 2 and 3 show the left boom arm 90 in a first extended, spray position, where only the first segment 100 of the left boom arm 90 is extended. Moreover, FIG. 2 shows the left boom arm 90 at a first spray height and FIG. 3 shows the left boom arm at a second spray height. FIG. 4 shows the left boom arm in a second extended, spray position, where all of the first, second, and third segments 100-110 are extended. The boom center segment and/or the first, second, and third boom arm segments 100-110 are configured with actuators to allow the left boom arm 90 to fold and extend as necessary for operation.

With reference to FIG. 2, the first boom arm segment 100 has an inner end 135 that is connected with hinge 140 to the boom center section 85. The hinge 140 is configured to allow for generally forward/rearward horizontal pivoting of the first boom arm segment 100, and consequently second and third boom arm segments 105 and 110, away/toward the chassis 15 when pivoting the first boom arm segment 100. Each boom arm can be further controlled to tilt when deployed, such as near the hinge 140.

The second boom arm segment 105 has an inner end 145 that is connected with hinge 150 to the outer end 155 of the first boom arm segment 100. The hinge 150 is configured to allow for generally rotating the second boom arm segment 105, and consequently third boom arm segment 110, away/toward the first boom arm segment 100 when pivoting the second boom arm segment 105.

With reference to FIG. 4, the third boom arm segment 110 has an inner end 160 that is connected with hinge 165 to the outer end 170 of the second boom arm segment 100. The hinge 165 is configured to allow for generally rotating the third boom arm segment 110 away/toward the second boom arm segment 105 when pivoting the third boom arm segment 110.

Figure 5:
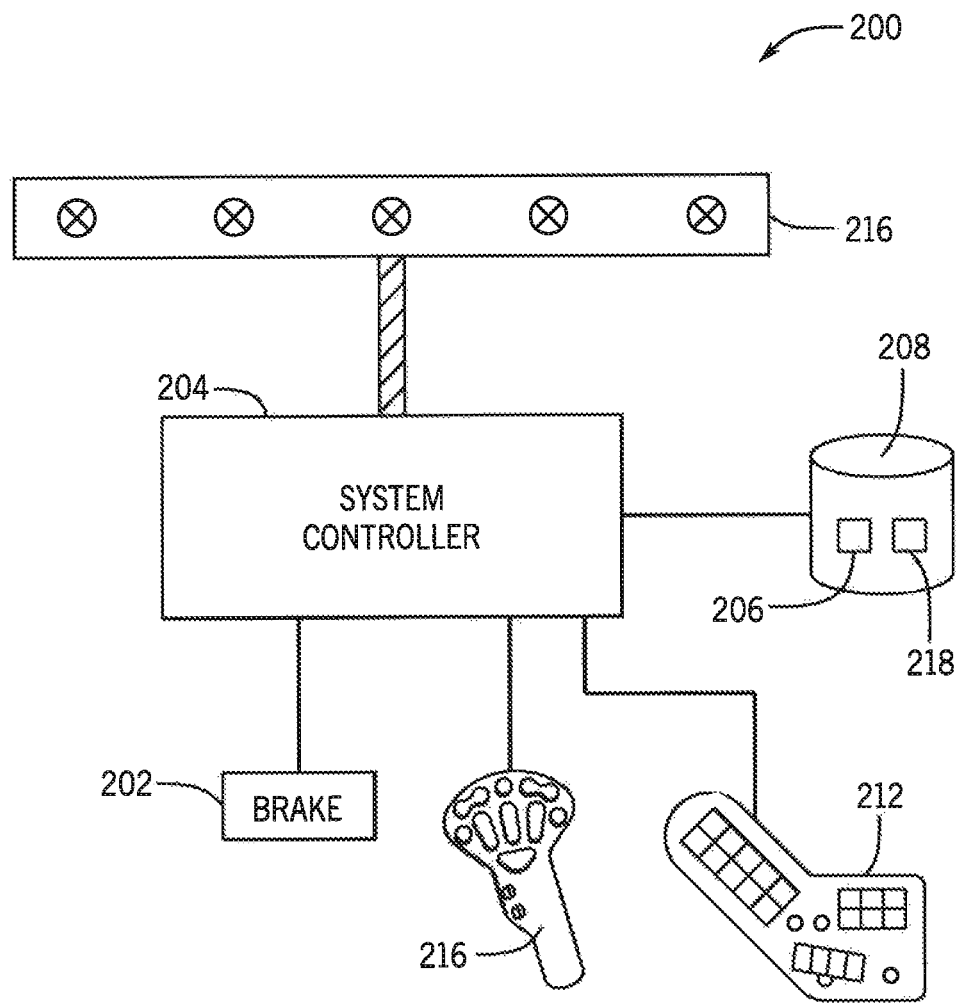
FIG. 5 is a diagram of a system for controlling folding and unfolding of the boom.

With reference to FIG. 5, according to an aspect of the invention, in an electronic control system 200 for controlling the boom 75, a brake pedal 202 of the sprayer 10 can be used as an interface to control auto fold or retract sequences, such as in the order of FIG. 4, FIG. 3, FIG. 2 then FIG. 1, and/or auto unfold or deploy sequences, such as in the order of FIG. 1, FIG. 2, FIG. 3 then FIG. 4, on the sprayer 10. The brake pedal 202 can be an ordinary brake pedal, such as a foot brake arranged in the operator cab 35, used primarily by the operator for braking the sprayer 10 when the brake pedal is depressed. This can allow functionality to be moved from a button, such as on the armrest, which ordinarily must be pressed and held by the operator for the auto fold/unfold sequences to occur, to the brake pedal 202, by using a controller 204 executing a program 206 stored in a non-transient medium 208.

Figure 6:
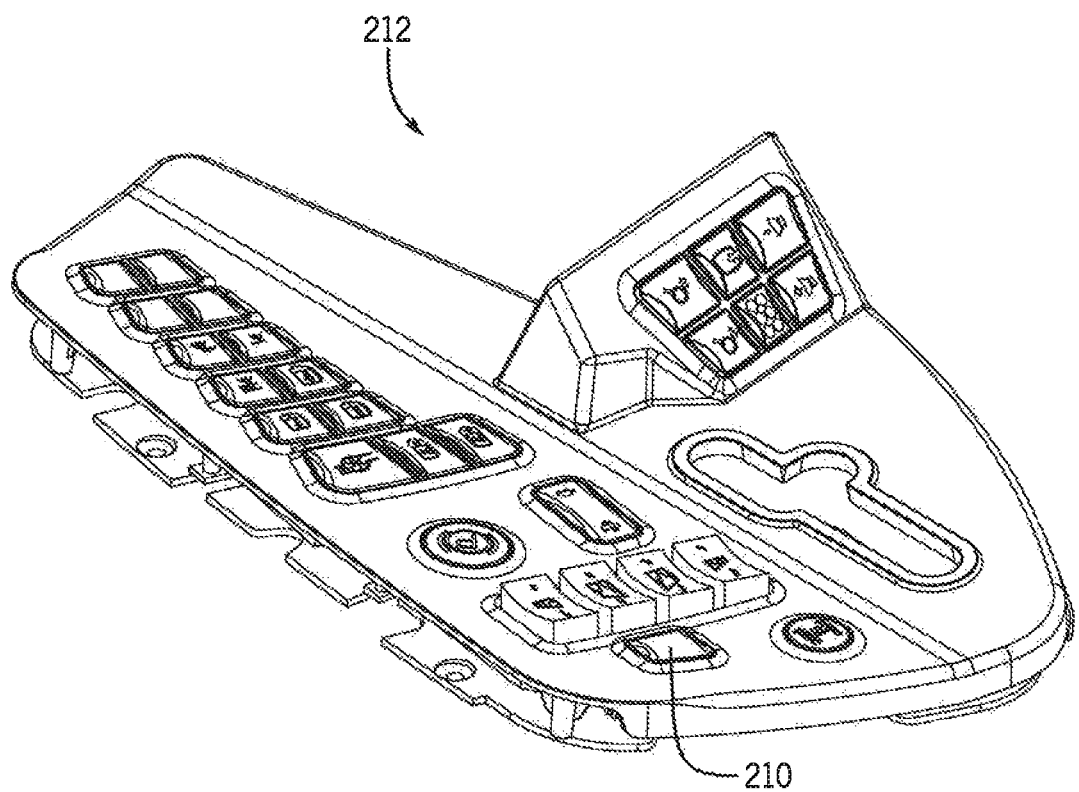
FIG. 6 is an isometric view of an armrest including a button for sending a command for folding and unfolding of the boom.

With additional reference to FIG. 6, in one aspect, a button 210 on an armrest 212 arranged in the operator cab 35 can send a command to the controller 204 to start the auto fold/unfold sequence. In another aspect, a button on a joystick 214 arranged in the operator cab 35 can also send the command. After the command is sent, as long as the brake pedal 202 is depressed, or held down to within a threshold adequate for stopping movement of the wheels 50, the controller 204 can control a set of actuators 216, including the aforementioned actuators of FIGS. 1-4, to fold or unfold the boom 75 as commanded. Accordingly, the operator can remove his hand from the button 210 while the sequence executes, advantageously allowing the operator to have the use of his hands. If the brake pedal 202 ceases to be depressed, such as due to the operator lifting his foot off of the brake, or if the operator initiates a different boom control button press, such as on the armrest 212, the auto fold/unfold sequence can stop.

In one aspect, the controller 204 can fold/unfold the boom to predetermined positions, such as a given tilt or height of the boom. Such positions can be defined by the operator in a look up table 218 stored in the non-transient medium 208.

Figure 7:
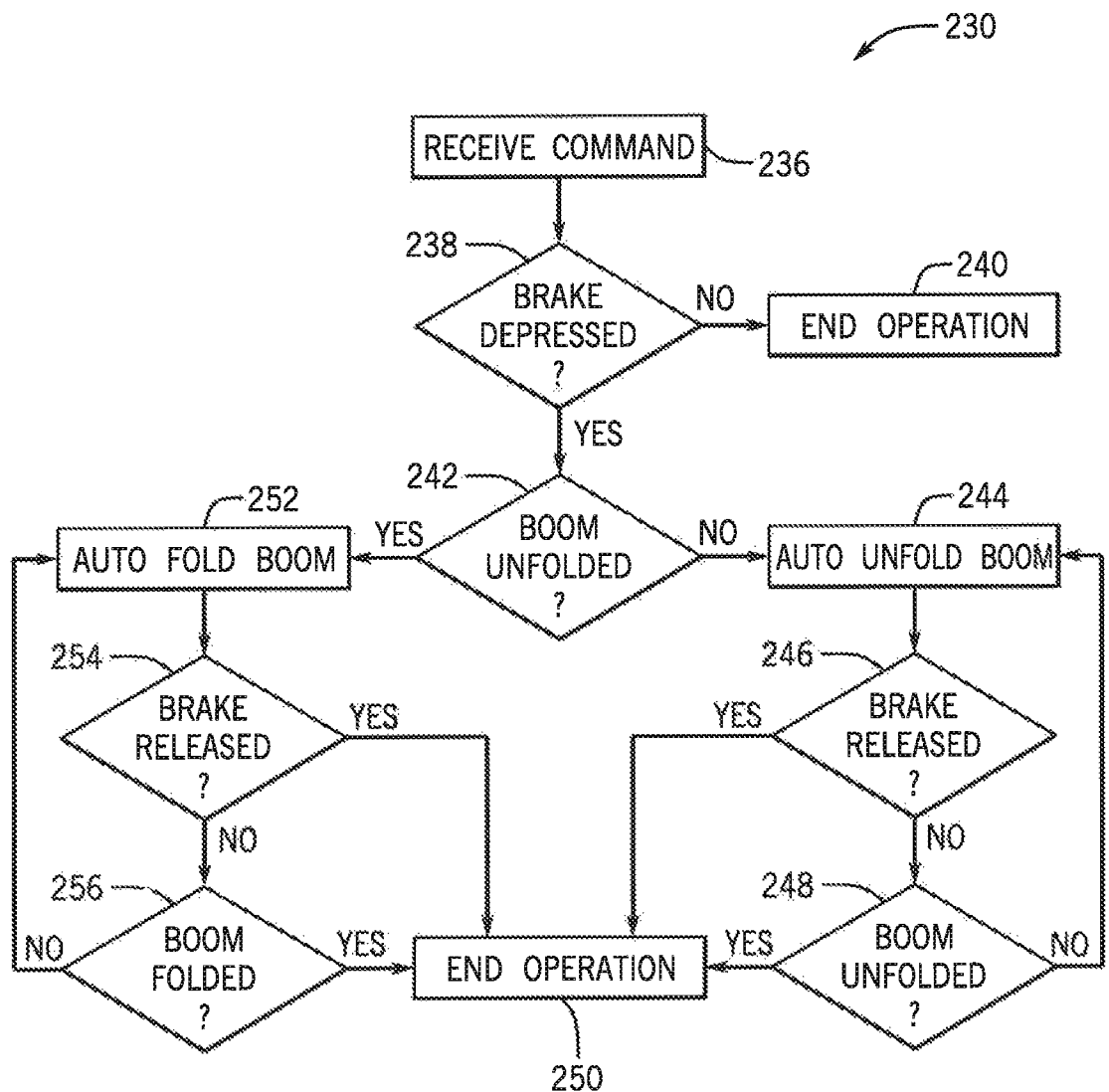
FIG. 7 is a flow chart of a process for folding and unfolding of the boom.

With reference to FIG. 7, a flow chart of a process 230 for folding and unfolding of the boom 75 is provided according to an aspect of the invention. Beginning at step 236, the controller 204 can receive a command from the operator for automatically initiating a fold or unfold sequence. The command could be sent, for example, by a single, momentary press of the button 210, or by a single, momentary press of a button of the joystick 214. Then, at decision step 238, the controller 204 can determine if the brake pedal 202 is sufficiently depressed to within a threshold. If the brake pedal 202 is not sufficiently depressed ("No"), the process 230 can end the operation, and the operator can try again with a subsequent command at step 236. However, if the brake pedal 202 is sufficiently depressed ("Yes"), at decision step 242, the controller 204 can determine if the boom 75 is currently unfolded (or folded). This determination could be made, for example, by sensing weights of both the left and right boom arms on saddles of the sprayer 10 for holding the boom arms (folded) (FIG. 1), and/or by failing to sense weights of either the left or right boom arms on the saddles (unfolded) (FIGS. 2-4).

At decision step 242, if the controller 204 determines the boom 75 is currently folded (or not unfolded) ("No"), the controller 204 can then execute to automatically unfold the boom via the set of actuators 216 at step 244. While unfolding the boom, at decision step 246 the controller 204 can continuously monitor the brake pedal 202 for any release thereof. If the brake pedal 202 is released ("Yes"), the controller 204 can end the operation at step 250, regardless of how much progress the boom 75 has made toward unfolding, and the operator can try again with a subsequent command at step 236. However, if at decision step 246 the brake pedal 202 is not released ("No"), the controller 204 can next determine at decision step 248 whether the boom is unfolded, including to the predetermined position, as desired. If at decision step 248 the boom is determined to not yet be unfolded ("No"), the process can return to step 244 for automatically unfolding the boom, and decision step 246 for monitoring the brake pedal 202, until the boom is unfolded. If at decision step 248 the boom is determined to be unfolded ("Yes"), the controller 204 can end the operation at step 250. With the boom unfolded, the operator can repeat the process 230 to fold the boom by sending another command at step 236.

Returning again to decision step 242, if the controller 204 determines the boom 75 is currently unfolded (or not folded) ("Yes"), the controller 204 can then execute to automatically fold the boom via the set of actuators 216 at step 252. While folding the boom, at decision step 254 the controller 204 can continuously monitor the brake pedal 202 for any release thereof. If the brake pedal 202 is released ("Yes"), the controller 204 can end the operation at step 250, regardless of how much progress the boom 75 has made toward folding, and the operator can try again with a subsequent command at step 236. However, if at decision step 254 the brake pedal 202 is not released ("No"), the controller 204 can next determine at decision step 256 whether the boom is folded, including to the predetermined position, as desired.

If at decision step 256 the boom is determined to not yet be folded ("No"), the process can return to step 252 for automatically folding the boom, and decision step 254 for monitoring the brake pedal 202, until the boom is folded. If at decision step 256 the boom is determined to be folded ("Yes"), the controller 204 can end the operation at step 250. With the boom folded, the operator can repeat the process 230 to unfold the boom by sending another command at step 236.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. A system for controlling an application boom mounted to an agricultural vehicle, comprising:
   an application boom configured to deliver agricultural product to a field, the application boom having a plurality of actuators configured to fold and unfold the boom relative to the agricultural vehicle;
   a brake pedal for braking the agricultural vehicle when the brake pedal is depressed; and
   a controller in communication with the plurality of actuators and the brake pedal, the controller having a processor executing a program stored in a non-transient medium operable to:
   receive a command to fold or unfold the boom relative to the agricultural vehicle; and
   following the command, control the plurality of actuators to fold or unfold the boom relative to the agricultural vehicle while the brake pedal is depressed and cease to fold or unfold the boom relative to the agricultural vehicle when the brake pedal ceases to be depressed.

2. The system of claim 1, further comprising a button accessible to a user in an operator cab of the agricultural vehicle, wherein the controller receives the command upon actuation of the button.

3. The system of claim 2, wherein the button is arranged on an armrest.

4. The system of claim 1, wherein the application boom comprises left and right boom arms coupled to a center section in which the left boom arm folds or unfolds relative to a left side of the agricultural vehicle and the right boom arm folds or unfolds relative to a right side of the agricultural vehicle.

5. The system of claim 4, wherein each boom arm comprises a plurality of segments with an actuator of the plurality of actuators being configured to move each segment.

6. The system of claim 5, wherein the plurality of segments consists of three booms segments.

7. The system of claim 4, wherein the plurality of actuators comprises a first actuator configured to tilt the left boom arm and a second actuator configured to tilt the right boom arm.

8. The system of claim 4, wherein the plurality of actuators comprises at least one actuator configured to raise the center section to fold the boom or lower the center section to unfold the boom.

9. The system of claim 1, further comprising the controller being operable to unfold the boom to a predetermined position defined by a user, the predetermined position comprising tilt and height of the boom as configured by the user.

10. An agricultural vehicle comprising:
a chassis;
wheels supporting the chassis for moving the vehicle;
an application boom supported by the chassis, the application boom being configured to deliver agricultural product to a field, the application boom having a plurality of actuators configured to fold and unfold the boom relative to the agricultural vehicle;
an operator cab supported by the chassis, the operator cab having a brake pedal for braking the agricultural vehicle when depressed; and
a controller in communication with the plurality of actuators and the brake pedal, the controller having a processor executing a program stored in a non-transient medium operable to:
 receive a command to fold or unfold the boom relative to the agricultural vehicle; and
 following the command, control the plurality of actuators to fold or unfold the boom relative to the agricultural vehicle while the brake pedal is depressed and cease to fold or unfold the boom relative to the agricultural vehicle when the brake pedal ceases to be depressed.

11. The agricultural vehicle of claim 10, further comprising a button accessible to a user in the operator cab, wherein the controller receives the command upon actuation of the button.

12. The agricultural vehicle of claim 11, wherein the button is arranged on an armrest.

13. The agricultural vehicle of claim 10, wherein the application boom comprises left and right boom arms coupled to a center section in which the left boom arm folds or unfolds relative to a left side of the agricultural vehicle and the right boom arm folds or unfolds relative to a right side of the agricultural vehicle.

14. The agricultural vehicle of claim 13, wherein each boom arm comprises a plurality of segments with an actuator of the plurality of actuators being configured to move each segment.

15. The agricultural vehicle of claim 14, wherein the plurality of segments consists of three booms segments.

16. The agricultural vehicle of claim 10, further comprising the controller being operable to unfold the boom to a predetermined position defined by a user, the predetermined position comprising a tilt and a height configured by the user.

17. A system for controlling an application boom mounted to an agricultural vehicle, comprising:
an application boom configured to deliver agricultural product to a field, the application boom having a plurality of actuators configured to fold and unfold the boom relative to the agricultural vehicle;
a brake pedal for braking the agricultural vehicle when the brake pedal is depressed; and
a controller in communication with the plurality of actuators and the brake pedal, the controller having a processor executing a program stored in a non-transient medium operable to:
 receive a command to fold or unfold the boom relative to the agricultural vehicle;
 determine if the brake pedal is depressed to within a threshold;
 control the plurality of actuators to fold or unfold the boom relative to the agricultural vehicle in response to receiving the command while the brake pedal is depressed to within the threshold; and
 cease to fold or unfold the boom relative to the agricultural vehicle in response to receiving the command while the brake pedal is not depressed to within the threshold.

* * * * *